(12) United States Patent
Myers, III et al.

(10) Patent No.: US 8,941,874 B2
(45) Date of Patent: Jan. 27, 2015

(54) METHOD AND APPARATUS FOR AUTOMATICALLY ENTERING DATA IN A PRINT ORDER BASED UPON A PROSE ATTRIBUTE ENTRY

(71) Applicant: Xerox Corporation, Norwalk, CT (US)

(72) Inventors: Charles R. Myers, III, Penfield, NY (US); Marc F. Cote, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 156 days.

(21) Appl. No.: 13/671,042

(22) Filed: Nov. 7, 2012

(65) Prior Publication Data
US 2014/0126024 A1    May 8, 2014

(51) Int. Cl.
    G06K 15/00    (2006.01)
    G06F 17/24    (2006.01)
    G06F 17/27    (2006.01)
    G06F 3/12     (2006.01)

(52) U.S. Cl.
    CPC ............ *G06F 17/243* (2013.01); *G06F 17/277* (2013.01)
    USPC ......................................... 358/1.18; 358/1.1

(58) Field of Classification Search
    CPC ...... G06F 3/1211; G06F 3/1262; G06K 15/02
    USPC ............ 358/1, 1.15, 1.18, 448, 474; 715/202, 715/247, 234; 709/203; 345/619, 528
    See application file for complete search history.

(56) References Cited

U.S. PATENT DOCUMENTS

| | | | |
|---|---|---|---|
| 5,524,085 A | 6/1996 | Bellucco et al. | |
| 6,647,222 B1 | 11/2003 | Digby et al. | |
| 7,495,796 B2 * | 2/2009 | Keane et al. | 358/1.18 |
| 8,634,089 B2 * | 1/2014 | Keane et al. | 358/1.15 |
| 2001/0013947 A1 * | 8/2001 | Van Der Linden et al. | 358/1.15 |
| 2006/0062459 A1 * | 3/2006 | Saito et al. | 382/181 |

OTHER PUBLICATIONS

Ludovic Jean-Louis et al., "Text Segmentation and Graph-based Method for Template Filling in Information Extraction," Proceedings of the 5$^{th}$ International Joint Conference on Natural Language Processing, pp. 723-731, Chiang Mai, Thailand, Nov. 8-13, 2011. pp. 723-731.

* cited by examiner

*Primary Examiner* — Gabriel Garcia

(57) ABSTRACT

A method, non-transitory computer readable medium, and apparatus for entering data in a print order based upon a prose attribute are disclosed. For example, the method receives a print job request comprising a prose attribute field that comprises the prose attribute, analyzes the prose attribute to identify one or more print job parameters as data for the print order, identifies one or more fields in the print order that correspond to the one or more print job parameters, and populates the one or more fields with the data obtained from the prose attribute.

16 Claims, 5 Drawing Sheets

Description:

All fields marked * are required.
Job ID NA

Job Name*
[New Account Flyer] — 202

Category*
[Comm. Print ▼] — 204

Subcategory*
[Flyer ▼] — 206

Description*
Example: Rack Brochure for XYZ campaign.
[10K A4 2pp printed 4 col process + PMS 3272 green plus overall sealer varnish both sides. Trimmed to size & packed to suit for] — 208

Customer Name*
[Client1 ▼] — 210

Customer Department
[Marketing] — 212

Budget Line/Cost Center
[ ]

Bid Due On *
[25 ▼] [March ▼] [2012 ▼]
[5 ▼]:[00 ▼] [PM ▼] — 214

Order/Delivery Due On *
[1 ▼] [April ▼] [2012 ▼]
[5 ▼]:[00 ▼] [PM ▼] — 216

Artwork Due Date
[ ▼] [ ▼] [ ▼]
[5 ▼]:[00 ▼] [PM ▼]

Special Instructions
Example: Please call when proofs are complete.
[ ] — 218

Samples Requested
[ ]

METHOD AND APPARATUS FOR AUTOMATICALLY ENTERING DATA IN A PRINT ORDER BASED UPON A PROSE ATTRIBUTE ENTRY

The present disclosure relates generally to automated data entry using prose and, more particularly, to a method and an apparatus for automatically entering data in a print order based upon a prose attribute entry.

BACKGROUND

Many customers may need to have various print jobs fulfilled for their businesses. Typically, the customer may fill out a job request in order for suppliers to bid on his or her print job requests.

Alternatively, a third party may receive the job request from the customer and manually fill out a print order form based upon the job request. The print order form may be used to estimate pricing based upon contracted rates from a number of suppliers. The suppliers may then use the estimated pricing to submit bids on the print job request. However, manually entering data on the print order form is inefficient.

SUMMARY

According to aspects illustrated herein, there are provided a method, a non-transitory computer readable medium, and an apparatus for entering data in a print order based upon a prose attribute. One disclosed feature of the embodiments is a method that receives a print job request comprising a prose attribute field that comprises the prose attribute, analyzes the prose attribute to identify one or more print job parameters as data for the print order, identifies one or more fields in the print order that correspond to the one or more print job parameters, and populates the one or more fields with the data obtained from the prose attribute.

Another disclosed feature of the embodiments is a non-transitory computer-readable medium having stored thereon a plurality of instructions, the plurality of instructions including instructions which, when executed by a processor, cause the processor to perform a method that receives a print job request comprising a prose attribute field that comprises the prose attribute, analyzes the prose attribute to identify one or more print job parameters as data for the print order, identifies one or more fields in the print order that correspond to the one or more print job parameters, and populates the one or more fields with the data obtained from the prose attribute.

Another disclosed feature of the embodiments is an apparatus comprising a processor that is configured to receive a print job request comprising a prose attribute field that comprises the prose attribute, analyze the prose attribute to identify one or more print job parameters as data for the print order, identify one or more fields in the print order that correspond to the one or more print job parameters, and populate the one or more fields with the data obtained from the prose attribute.

BRIEF DESCRIPTION OF THE DRAWINGS

The teaching of the present disclosure can be readily understood by considering the following detailed description in conjunction with the accompanying drawings, in which:

FIG. 2 illustrates an example of a print job request;

FIG. 3 illustrates an example of a print job order;

To facilitate understanding, identical reference numerals have been used, where possible, to designate identical elements that are common to the figures.

DETAILED DESCRIPTION

The present disclosure broadly discloses a method and non-transitory computer readable medium for automatically entering data in a print order based upon a prose attribute. As discussed above, some customers send out print job requests such that suppliers may bid on these print job requests. Typically, the print job requests are received and manually entered into a print order form that is used to estimate pricing used by the suppliers to bid on the print job requests. However, manually entry can be time consuming, inefficient and lead to human errors.

The print job requests may include a prose attribute field that allows the customers to add some additional information. Typically, the prose attribute field includes information that is rarely used or looked at when the print job request is processed. However, the prose attribute field may include information that may be leveraged to automatically enter data in various job parameter fields of the print order form (e.g., broadly using a hardware processor to process the prose attribute field without assistance from a human user).

Figure 1:
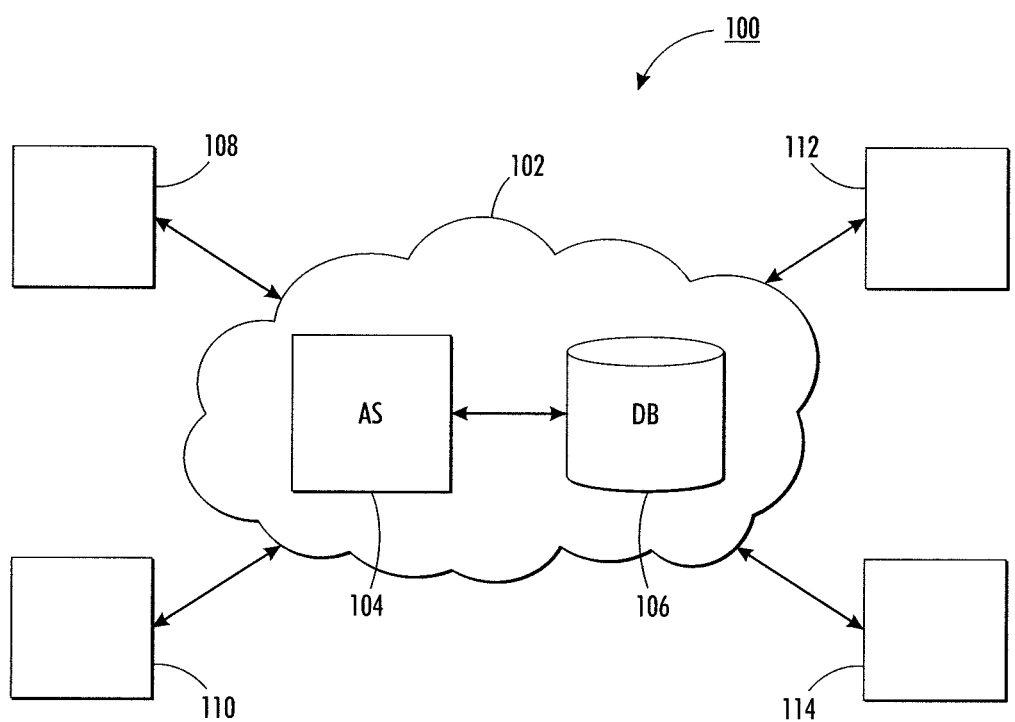
FIG. 1 illustrates one example of a communication network of the present disclosure.

To better understand the present disclosure, FIG. 1 illustrates an example of a communication network 100. In one embodiment, the communication network 100 includes a packet network such as an Internet Protocol (IP) network 102. The IP network 102 may be, for example, the Internet, a service provider network, an access network, a core network, a local area network, and the like.

In one embodiment, the IP network 102 may include an application server (AS) 104 and a database (DB) 106. In one embodiment, the AS 104 may host a web application for presenting forms for customers to enter print job requests and preparing print job orders for suppliers. In one embodiment, the AS 104 may be, for example, a MarketPort® application for calculating an estimated cost to produce a print job as part of a reverse auction workflow.

In one embodiment, the DB 106 may store various information associated with the customers, suppliers and the web application. For example, the DB 106 may store contact information for customers, contact information for suppliers, current bids from suppliers, estimated costs for print job requests, completed print job request forms, completed print job order forms, form templates, and the like.

Although the AS 104 and the DB 106 are illustrated as being in the IP network 102, it should be noted that the AS 104 and DB 106 could be located at a third party location outside of the IP network 102. For example, the AS 104 and DB 106 may be at an enterprise location that is in communication with the IP network 102.

In one embodiment, one or more customers may access the web application hosted by the AS 104 via one or more endpoint devices 108 and 110. The one or more endpoint devices 108 and 110 may be any type of endpoint device capable of communicating with the IP network 102 and having a user interface to interact with the web application. For example, the one or more endpoint devices 108 and 110 may include a desktop computer, a laptop computer, a tablet device, a smart phone, a personal digital assistant, a netbook and the like. Although only two customer endpoint devices are illustrated in FIG. 1 it should be noted that any number of customer endpoint devices may be deployed.

In one embodiment, the customer may enter print job requests via his or her respective endpoint device. For example, the customer may access a web application and be presented with a print job request form to enter a print job request. An example of the print job request form 200 is illustrated in FIG. 2. The print job request form 200 may include various fields for the customer to enter information. The fields may be either text entry or drop down menus.

The fields may include, for example, a job name field 202, a category field 204, a subcategory field 206, a prose attribute field 208 (also referred to as a description field), a customer name field 210, a customer department field 212, a bid due date field 214, an order due date field 216, a special instruction field 218, and the like. The above fields are listed as examples only and the print job request form 200 may include more fields or less fields.

Currently, when the print job request form 200 is received by the AS 104, a document advisor reviews the print job request form 200 and manually enters job parameters in the print job request form 200 into a print job order form. However, many of the job parameters needed for the print job order form may be found in the prose attribute field 208. The prose attribute field 208 may include prose that is in an abbreviation form that is specific to the print industry. For example, several print job terms may be abbreviated or have a particular form that is standardized in certain regions.

In one embodiment, a natural language processor (e.g., a neural network) may be used to analyze the prose attribute field 208 and identify one or more print job parameters from the prose entered in the prose attribute field 208. In another embodiment, a pre-defined dictionary of print job terms may be used to try and identify text in a particular form that matches a form of known abbreviations stored in the pre-defined dictionary.

For example, the prose attribute field 208 may include the following prose "10K A4 2pp printed 4 col process+PMS 3272 green plus overall sealer varnish both sides. Trimmed to size & packed to suit for delivery. On Regency Silk 130 gsm." The abbreviation "10K" may be identified as a quantity parameter of 10,000. The abbreviation "A4" may be identified as a paper size parameter of ISO A4 (210 millimeter (mm)×297 mm). The abbreviation "2pp" may be a page count parameter of 2 pages. The abbreviation "4 col process+PMS 3272 green plus overall sealer varnish both sides" may be a color parameter requesting a 4 color process of cyan, magenta, yellow and key (CYMK) and Pantone PMS 3272 with 1 flood varnish on both the front and back. The prose "on Regency Silk" may be a paper finish parameter requesting a coated silk paper finish. The abbreviation "130 gsm" may be a paper weight parameter requesting paper that has a grammage of 130 grams per square meter.

The above abbreviations and forms of text found in the prose attribute field 208 are only listed as examples. It should be noted that other abbreviations and forms of text may be available and may vary from region to region. In addition, the pre-defined dictionary may be trained based upon the region in which the pre-defined dictionary is located.

In one embodiment, the prose attribute field 208 may have a pre-defined order of prose or attributes such that the job parameters may be easily identified. For example, the pre-defined order may require the customer to enter prose or abbreviations in the order of quantity, paper size, total pages, color specifications, finish and paper weight. This would help speed up the processing required by the natural language processor or pre-defined dictionary to identify the job parameters in the prose attribute field 208.

In one embodiment, if text of a particular form is unknown or no match is found in the pre-defined dictionary, the customer may be prompted to provide a definition for the text or prose. For example, the web application may provide a pop-up window to have the customer define the text (i.e., broadly providing a definition for the text) that is unknown or that has no match in the pre-defined dictionary. The pre-defined dictionary may then be updated with the newly defined abbreviation or form of text (i.e., broadly updating the pre-defined dictionary with the text and the associated definition provided by the user).

In one embodiment, the print job parameters identified from the analyzed prose attribute field 208 may optionally be translated into an extensible markup language (XML) format. Placing the print job parameters in a system independent format allows the print job parameters to be stored and used as inputs for other computerized systems such as job ticketing, job estimation, print procurement and the like.

In one embodiment, one or more suppliers may access the web application hosted by the AS 104 via one or more endpoint devices 112 and 114. The one or more endpoint devices 112 and 114 may be any type of endpoint device capable of communicating with the IP network 102 and having a user interface to interact with the web application. For example, the one or more endpoint devices 112 and 114 may include a desktop computer, a laptop computer, a tablet device, a smart phone, a personal digital assistant, a netbook and the like. Although only two supplier endpoint devices are illustrated in FIG. 1 it should be noted that any number of supplier endpoint devices may be deployed.

In one embodiment, one or more suppliers may bid on print job orders via their respective endpoint devices. For example, a supplier may access a web application and view print job orders that include specifications for the print job.

Previously, the print job order was manually created by a document advisor based upon data found in the print job request form 200. However, in one embodiment of the present disclosure, one or more print job parameters in the print job order may be automatically populated based upon one or more print job parameters that are identified in the prose attribute field 208 of the print job request form 200.

Figure 3:
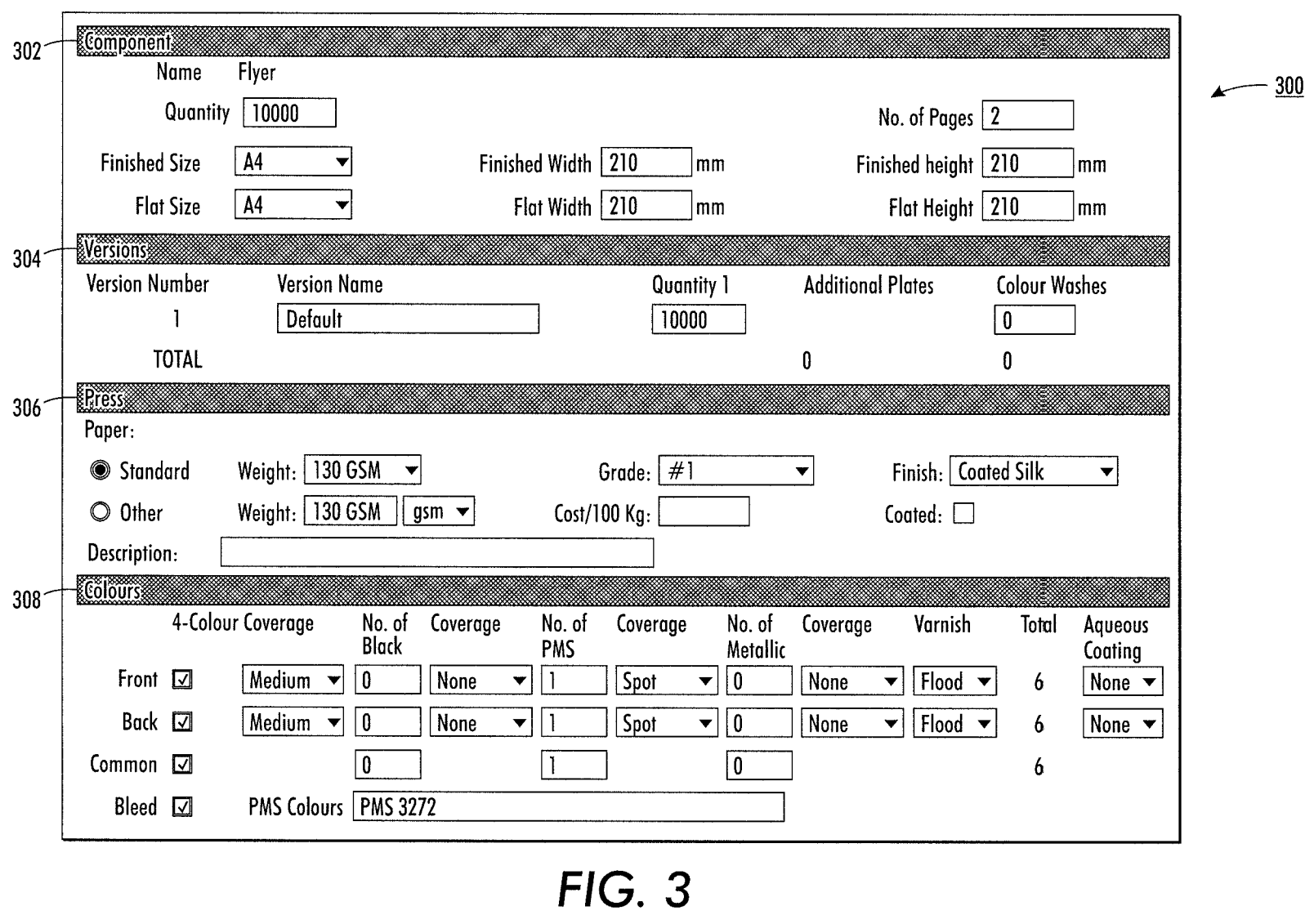

One example of a print job order form 300 is illustrated in FIG. 3. The print job order form 300 may include various sections, such as for example, a component section 302, a versions section 304, a press section 306 and a colors section 308. Each one of the sections may include one or more fields for a specific print job parameter. The sections and fields illustrated in FIG. 3 are only examples and it should be noted that more sections or fields or less sections or fields may be included.

As noted above, one or more print job parameters may be identified from the prose attribute field 208 of the print job request form 200. The one or more print job parameters may then be used to populate one or more fields in the print job order form 300. For example, using the above example prose of "10K A4 2pp printed 4 col process+PMS 3272 green plus overall sealer varnish both sides. Trimmed to size & packed to suit for delivery. On Regency Silk 130 gsm" various fields can be automatically populated in the print job order form 300.

The AS 104 may identify one or more fields in the print job order form 300 that correspond to a respective one of the one or more identified print job parameters, and then populate the one or more fields with the appropriate values or inputs. FIG. 3 illustrates that the quantity field, the finished size and number of pages in the component section 302, the paper weight field, the grade field and the finish field in the press section 306 and the front and back color (or colour) fields in the color (or colour) section 308 have been automatically populated.

As a result, a document advisor may not be required to manually enter data in the print job order form 300. Over the course of thousands to millions of print job order forms, many hours of labor and costs may be saved.

It should be noted that the network 100 has been simplified for clarity. For example, the network 100 may include other network elements such as border elements, routers, switches, policy servers, security devices, firewalls, a content distribution network (CDN) and the like. In addition, the network 100 may include additional networks between the endpoint devices and the IP network 102 such as different access networks (e.g., a wired access network, a cable network, a wireless network, a cellular network, a Wi-Fi network, and the like) to reach the IP network 102.

Figure 4:
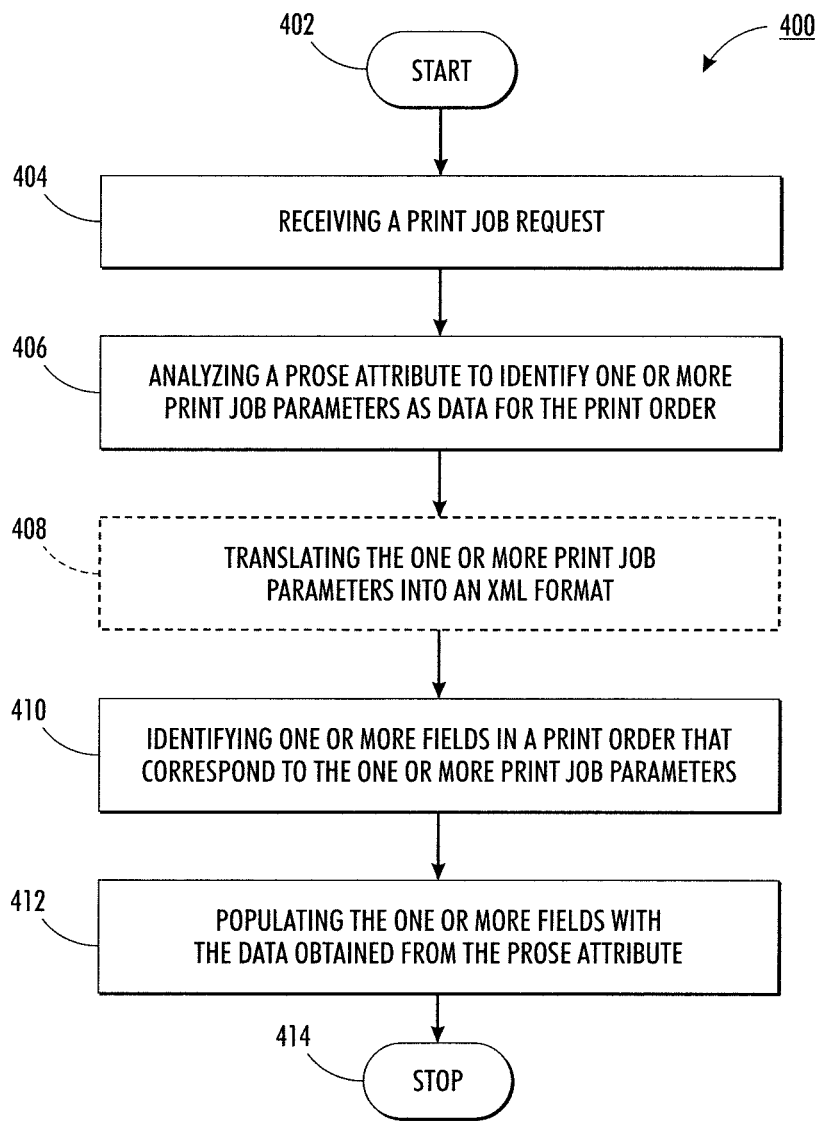
FIG. 4 illustrates an example flowchart of one embodiment of a method for automatically entering data in a print order based upon a prose attribute.
Figure 5:
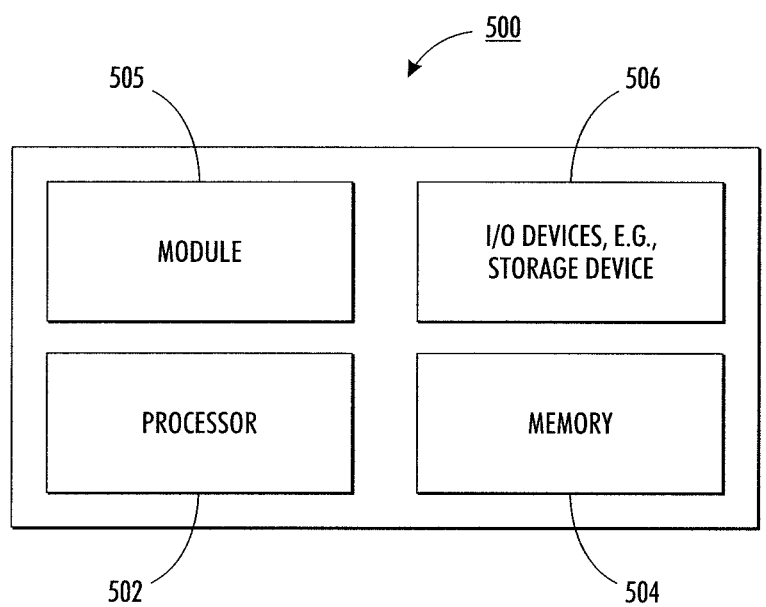
FIG. 5 illustrates a high-level block diagram of a general-purpose computer suitable for use in performing the functions described herein.

FIG. 4 illustrates a flowchart of a method 400 for automatically entering data in a print order based upon a prose attribute. In one embodiment, the method 400 may be performed by the AS 104 or a general-purpose computer as illustrated in FIG. 5 and discussed below.

The method 400 begins at step 402. At step 404, the method 400 receives a print job request. In one embodiment, the print job request may include a prose attribute field that includes a prose attribute. For example, the AS 104 may host a web application that provides an interface to a customer to generate a print job request. In one embodiment, the customer may enter data into the print job request form 200 via the web application.

At step 406, the method 400 analyzes the prose attribute to identify one or more print job parameters as data for the print order. For example, the prose attribute field 208 may include the following prose "10K A4 2pp printed 4 col process+PMS 3272 green plus overall sealer varnish both sides. Trimmed to size & packed to suit for delivery. On Regency Silk 130 gsm." The AS 104 may analyze the prose attribute to look for specific forms in the text or certain abbreviations. In one embodiment, the AS 104 may use a natural language processor or a pre-defined dictionary to perform the analysis to identify a particular form of the text or certain abbreviations that provide information about specific print job parameters.

In another embodiment, a pre-defined dictionary of print job terms may be used. For example, a matching function may be employed where the AS 104 may try to match the text in the prose attribute field of the print job request with one of the print job terms in the pre-defined dictionary. For example, "#K" may represent a quantity value. Thus, the form of a number followed by the letter K may be a standard way of abbreviating the value in units of thousands for a quantity parameter. Thus, the abbreviation "10K" in the example above may be matched to the form "#K" in the pre-defined dictionary and be identified as a print job parameter of quantity equaling 10,000 copies.

The method 400 may then perform optional step 408. At optional step 408, the method 400 translates the one or more print job parameters into an XML format. The XML format is a system-independent format that allows the identified one or more print job parameters to be used as inputs for other computerized systems. For example, the one or more job parameters may be used as inputs for a job ticketing system, a job estimation system, a print procurement system, and the like.

At step 410, the method 400 identifies one or more fields in a print order that correspond to the one or more print job parameters. For example, once the one or more print job parameters are identified, the appropriate fields in the print job order form associated with each one of the one or more print job parameters may also be identified. As a result, the data associated with each one of the one or more print job parameters may be correctly inputted into the print job order form.

At step 412, the method 400 populates the one or more fields with the data obtained from the prose attribute. For example, the job parameter of quantity=10,000 may be obtained from the prose attribute "10K" in the example above. Thus, the quantity field in the print job order form may be automatically inputted with the value of 10,000 that was obtained from the prose attribute of "10K", as illustrated by example in FIG. 3. The method ends at step 414.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 4 that recite a determining operation, or involve a decision, do not necessarily require that both branches of the determining operation be practiced. In other words, one of the branches of the determining operation can be deemed as an optional step.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for automatically entering data in a print order based upon a prose attribute, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 505 for automatically entering data in a print order based upon a prose attribute can be loaded into memory 504 and executed by processor 502 to implement the functions as discussed above. As such, the present method 505 for automatically entering data in a print order based upon a prose attribute (including associated data structures) of the present disclosure can be stored on a non-transitory (e.g., physical and tangible) computer readable storage medium, e.g., RAM memory, magnetic or optical drive or diskette and the like. For example, the hardware processor 502 can be programmed or configured with instructions (e.g., computer readable instructions) to perform the steps, functions, or operations of method 400.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for entering data in a print order based upon a prose attribute, comprising:
   receiving, by a processor, a print job request comprising a prose attribute field that comprises the prose attribute;
   analyzing, by the processor, the prose attribute comprising abbreviations that represent print job terms to identify one or more print job parameters as data for the print order, wherein the analyzing is performed using a pre-defined dictionary of print job terms, wherein the analyzing comprises analyzing the prose attribute to identify text in a particular form that matches a corresponding print job term in the pre-defined dictionary;
   identifying, by the processor, one or more fields in the print order that correspond to the one or more print job parameters; and
   populating, by the processor, the one or more fields with the data obtained from the prose attribute.

2. The method of claim 1, wherein the print job request is obtained from a web based application.

3. The method of claim 1, further comprising:
   translating the one or more print job parameters into an extensible markup language (XML) format.

4. The method of claim 1, wherein the processor is a natural language processor.

5. The method of claim 1, further comprising:
   prompting a user to provide a definition for the text if no match to a print job term is found in the pre-defined dictionary; and
   updating the pre-defined dictionary to include the text and the definition.

6. The method of claim 1, wherein the prose attribute comprises one or more abbreviations related to the one or more print job parameters.

7. The method of claim 1, wherein the one or more print job parameters comprise at least one of: a quantity, a number of sides, a page count, a finished size, a paper weight, a paper grade, a paper finish, a color, a finishing or a type of packaging.

8. A non-transitory computer-readable medium storing a plurality of instructions, which when executed by a processor, cause the processor to perform operations for entering data in a print order based upon a prose attribute, the operations comprising:
   receiving a print job request comprising a prose attribute field that comprises the prose attribute;
   analyzing the prose attribute comprising abbreviations that represent print job terms to identify one or more print job parameters as data for the print order, wherein the analyzing is performed using a pre-defined dictionary of print job terms, wherein the analyzing comprises analyzing the prose attribute to identify text in a particular form that matches a corresponding print job term in the pre-defined dictionary;
   identifying one or more fields in the print order that correspond to the one or more print job parameters; and
   populating the one or more fields with the data obtained from the prose attribute.

9. The non-transitory computer-readable medium of claim 8, wherein the print job request is obtained from a web based application.

10. The non-transitory computer-readable medium of claim 8, further comprising:
    translating the one or more print job parameters into an extensible markup language (XML) format.

11. The non-transitory computer-readable medium of claim 8, wherein the processor is a natural language processor.

12. The non-transitory computer-readable medium of claim 8, further comprising:
    prompting a user to provide a definition for the text if no match to a print job term is found in the pre-defined dictionary; and
    updating the pre-defined dictionary to include the text and the definition.

13. The non-transitory computer-readable medium of claim 8, wherein the prose attribute comprises one or more abbreviations related to the one or more print job parameters.

14. The non-transitory computer-readable medium of claim 8, wherein the one or more print job parameters comprise at least one of: a quantity, a number of sides, a page count, a finished size, a paper weight, a paper grade, a paper finish, a color, a finishing or a type of packaging.

15. A method for entering data in a print order based upon a prose attribute, comprising:
    receiving, by a processor, a print job request comprising a prose attribute field that comprises the prose attribute, wherein the print job request is received from a web based application;
    analyzing, by the processor, the prose attribute to identify one or more print job parameters as data for the print order, wherein the analyzing comprises analyzing the prose attribute to identify one or more abbreviations that represent print job terms in a particular form using a pre-defined dictionary of print job terms that match a corresponding print job term in the pre-defined dictionary;
    identifying, by the processor, one or more fields in the print order that correspond to the one or more print job parameters; and
    populating, by the processor, the one or more fields with the data obtained from the prose attribute.

16. The method of claim 15, further comprising:
    translating the one or more print job parameters into an extensible markup language (XML) format.

* * * * *